R. A. FURRER.
COMBUSTION ENGINE LOCOMOTIVE.
APPLICATION FILED AUG. 17, 1916.
1,254,034.
Patented Jan. 22, 1918.
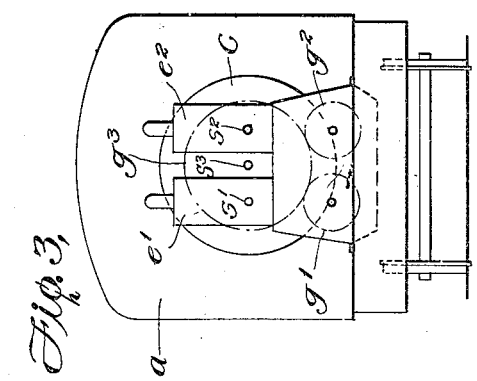
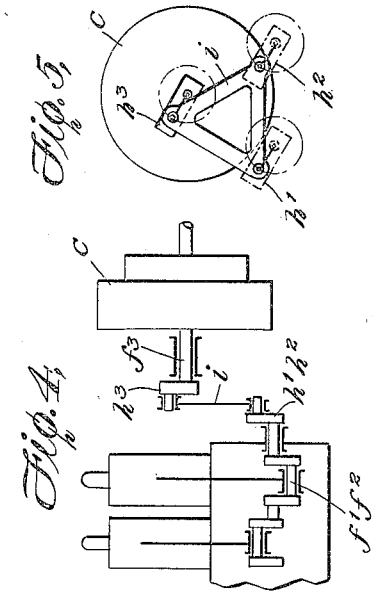
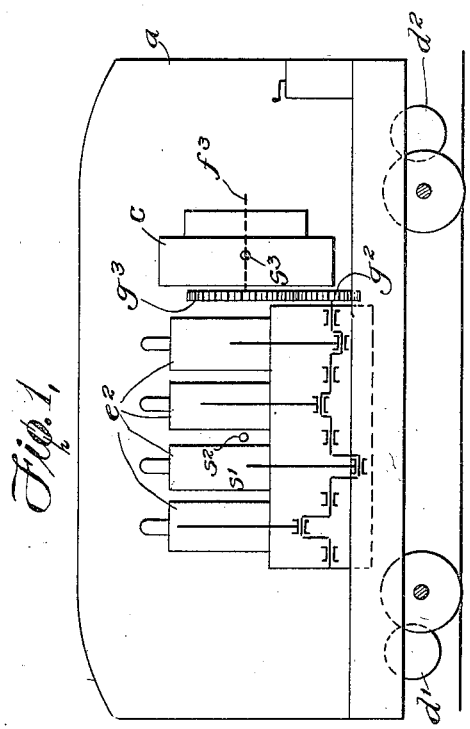
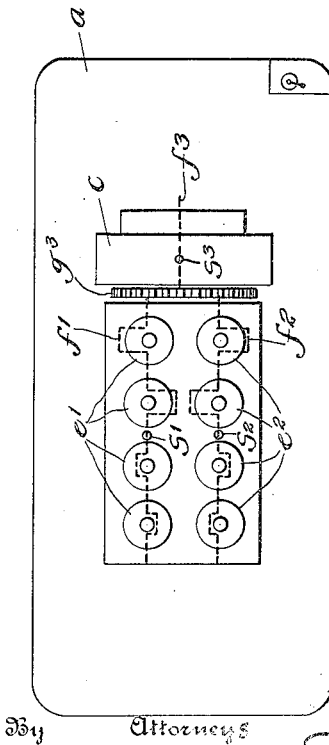

UNITED STATES PATENT OFFICE.

RUDOLF ADOLF FURRER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

COMBUSTION-ENGINE LOCOMOTIVE.

1,254,034.      Specification of Letters Patent.      Patented Jan. 22, 1918.

Application filed August 17, 1916. Serial No. 115,563.

*To all whom it may concern:*

Be it known that I, RUDOLF A. FURRER, a citizen of the Republic of Switzerland, residing in Winterthur, Canton of Zurich, Switzerland, Waldstrasse 4, have invented certain new and useful Improvements in Combustion-Engine Locomotives, of which the following is a full, true, and complete specification.

The invention relates to locomotives driven by internal combustion engines through electrical power transmission, and has for its object to secure a smoother running motion for the vehicle and reduction of the internal strains incident to side thrust, and also compactness and general improvements in the design of the power plant as a whole. To this end the combustion engine plant is divided, with its two parts or halves in parallel, and the shaft of the driven electric generator connected between them, instead of having the generator coupled in line with the engine as is usual with undivided power plants.

The accompanying drawings illustrate diagrammatically a carrying out of the invention.

Figure 1 is a side, sectional elevation;

Fig. 2 is a sectional plan;

Fig. 3 is a sectional end view; and

Figs. 4 and 5 are side and end views illustrative of an alternative form of coupling of the engine and generator shafts.

The locomotive $a$ has as its prime motor a divided combustion engine plant comprising the halves $e^1$ and $e^2$, each comprising a plurality of cylinders having their pistons connected with parallel crank shafts $f^1$ and $f^2$ at a common level with respect to the vehicle frame.

The electrical transmission comprises the generator $c$ and the electric motors $d^1$ and $d^2$, of which the generator is disposed at the end of the engine halves, but in central relation thereto, its shaft $f^3$ being between and above the crank shafts (or the projections thereof), from which it is driven. The circuit connections of the electric transmission are omitted from the drawings being well understood.

From the division of the plant and the relation of its parts as shown, it results that the distance between the centers of gravity $s^1$, $s^2$ and $s^3$ of the engine halves and the generator is much smaller than when the engine and generator are disposed in the customary manner; and as shown the special advantage can be realized of bringing these three centers of gravity approximately on a level. In this way the oscillating motions of the locomotive when rounding curves and taking switches are reduced, there is less strain on the substructure, and twisting of the locomotive frame is prevented. An important advantage, also, is the reduction in length and height of the entire power unit.

The crank shafts and generator shaft may be connected for driving in various ways. As represented in Figs. 1 to 3, the ends of the crank shafts bear gears $g^1$ and $g^2$ which mesh with a gear $g^3$ on the generator shaft. Instead of this construction the three shafts may be provided with terminal cranks $h^1$, $h^2$ and $h^3$, of equal throw, and these cranks connected by a coupling frame or triangular linkage $i$.

I claim:

1. In a combustion engine locomotive having electrical power transmission, the combination of a divided combustion engine plant having its halves disposed side by side, and an electric generator the shaft of which is in intermediate relation to the engine halves and driven jointly thereby.

2. The combination of a divided combustion engine plant the parts of which are disposed with their crank shafts in parallelism, a generator having its shaft in intermediate relation to and above said crank shafts, and means whereby the generator shaft is driven jointly by the crank shafts.

3. The combination of a divided combustion engine plant having its crank shafts in parallelism, a generator having its center of mass at approximately the same height as the centers of mass of the engine halves and its shaft in central and superior relation to the crank shafts, and connections whereby the generator is driven from both crank shafts jointly.

4. The combination of a divided combustion engine plant having its crank shafts parallel, a generator having its shaft in intermediate relation to the engine halves, said crank shafts and generator shaft having cranks for coupling, and a coupling frame connecting said cranks.

5. The combination of a divided combustion engine plant having its crank shafts parallel, a generator having its shaft in intermediate relation to the engine halves, said crank shafts and generator shaft having cranks for coupling and a triangular linkage coupling said cranks.

In testimony whereof, I have signed this specification in the presence of two witnesses.

RUDOLF ADOLF FURRER.

Witnesses:
 CARL GUBLER,
 OLGA AURIG.

Copies of this patent may be obtained for five cents each, by addressing the "Commissioner of Patents, Washington, D. C."